United States Patent [19]

Gilbert et al.

[11] Patent Number: 5,781,779
[45] Date of Patent: Jul. 14, 1998

[54] TOOLS FOR EFFICIENT SPARSE MATRIX COMPUTATION

[75] Inventors: John R. Gilbert, Palo Alto; John O. Lamping, Los Altos; Anurag Mendhekar, Mountain View, all of Calif.; Tatiana Shpeisman, Adelphi, Md.

[73] Assignee: Xerox Corporation, Stamford, Conn.

[21] Appl. No.: 573,707

[22] Filed: Dec. 18, 1995

[51] Int. Cl.$^6$ .................................................. G06F 9/45
[52] U.S. Cl. ..................... 395/707; 395/708; 364/280.4; 364/736.03
[58] Field of Search .................... 395/705, 707, 395/708, 706, 601, 614; 364/280.4, 736.03

[56] References Cited

U.S. PATENT DOCUMENTS

| | | | |
|---|---|---|---|
| 5,519,868 | 5/1996 | Allen et al. | 395/700 |
| 5,526,475 | 6/1996 | Razdow | 395/746 |

OTHER PUBLICATIONS

Koga et al., "MATX: A High-Performance Programming Language (Interpreter and Compiler) for Scientific and Engineering Computation", 1992 IEEE Symposium on Computer Aided Control System Design, pp. 15-22, Mar. 1992.

Koga et al., "A Compiler of MATLAB to MATX: Compiling and Linking of m-files to an Executable Program", Proceedings IEEE/IFAC Joint Symposium on Computer-Aided Control System Design, pp. 137-142, Mar. 1994.

*Primary Examiner*—Emanuel Todd Voeltz
*Assistant Examiner*—Michael T. Richey

[57] ABSTRACT

To generate computationally efficient computer program code for carrying out computer computations on matrix organized input data, a program first is written in a relatively high-level language which includes programmer specifiable constructs for manipulating matrices and parts thereof; and which permits certain of the constructs to be annotated to specify programmer selected data structures and programmer selected operations on those data structures. This high-level program then is translated into a relatively high-level program into a relatively low-level language using low-level language routines that provide a compilable representation of the program, including all programmer selected data structures and all programmer selected operations on said data structures then the low-level representation of the program is compiled to generate computer executable code for implementing the program, including all programmer selected data structures and all programmer selected operations on said data structures.

4 Claims, 9 Drawing Sheets

Naive loop

```
for k=1:n
    A(:,j) = A(:,j) - A(k,j) * L(:,k)
end
```

Matlab loop

```
k=min(find(A(:,j)))
while k~=[ ]
    A(:,j) = A(:,j) - A(k,j) * L(:,k)
    k=k+min(find(A(k,j)))
end
```

AML loop

```
for nzs k in order in A(:,j)
    A(:,j) = A(:,j) - A(k,j) * L(:,k)
end
```

AML:view A through P

```
for column j=1 to n do
  Update:
    for k=1 to j-1 do
      A(k+1:n,j) = A(k+1:n,j) -A(k,j) * L(k+1:n,k)
    end
  Pivot: for A, L, and U, interchange rows j and f,
    where abs (A(f,j)) = max(abs(A(j:n,j))
  Separate L and U: U(1:j,j) = A(1:j,j); L(j+1:n,j) = A(j+1:n,j)
  Divide: L(:,j) = L(:,j)/A(j,j)
end
```

```
for k=1 to j-1 do
  A(k+1:n,j) = A(k+1:n,j) -A(k,j) * L(k+1:n,k)
end
```

```
function [L,U,P] = lu (A);
n = max(size(A)); L = sparse(n,n); U = sparse(n,n);
P = [1:n];
for j = 1:n
    t = A(:,j);
    k = min (find(t(1:j-1)));
    while k~ = [ ]
        t(P(k+1:n)) = t(P(k+1:n)) - t(P(k)) * L(P(k+1:n),k);
        k = k + min(find(t(k+1:j-1)));
    end;
    [v,piv] = max(abs(a(P(j:n),j)));
    piv = piv + j - 1;
    P[piv,j] = P[j,piv];
    U(P(1:j),j) = t(P(1:j),j);
    L(P(j+1:n),j) = t(P(j+1:n),j) / t(P(j),j);
end;
U = U(P,:); L = L(P,:);
```

FIG. 8

```
function [L,U,P] = lu (A);
n = max(size(A)); L = zeros(n,n); U = zeros(n,n);
P = [1:n];
begin
    view A, L, U through (P,:)
    for j = 1:n
        SPA t;
        view t through P;
        t = A(:,j);
        for nzs k in order in t(1:j-1)
            t = t-t(k) * L(:,k);
        end;
        [v,piv] = max(abs(t(j:n)));
        piv = piv + j - 1;
        P([j,piv]) = P([piv,j]);
        L(:,j) = t(1:j-1);
        U(:,j) = t(j:n);
        L(:,j) = L(:,j)/v;
    end;
L = L(P,:); U = U(P,:);
```

FIG. 9

```
void lu(SparseMatrix &A, SparseMatrix &L, SparseMatrix &U, Permutation &P) {
    int n = A.size();  L.set_size(n,n);  U.set_size(n,n);
    P.initialize(n);
    SPA t;
    SparseVector c = A.get_column(j, NoPermutation, NoRange);
    load(t, NoPermutation, NoRange, c, NoPermutation, NoRange);
    Enumerator e(t, P, Range(1, j-1));
    for (k = e.get_first(); k! = 0; k = e.get_first())
        dpaxpy(t, NoPermutation, NoRange,
            A.get_column(k), NoPermutation, NoRange,
            -t.get_value(k, P, NoRange));
    int piv; Value v;
    findMaxAbs(t, P, Range(j,n), piv, v);
    P.swap(j, piv);
    split(t, P, NoRange, L.get_column(j), P, NoRange, U.get_column(j), P, NoRange, j);
    divide(L.get_column(j), P, NoRange, v);
    L.permute(P);
    U.permute(P);
}
```

FIG. 10

TOOLS FOR EFFICIENT SPARSE MATRIX COMPUTATION

BACKGROUND OF THE INVENTION

When reality is modeled by computation, sparse matrices are often the link between the continuous physical world and the finite algorithmic one. Engineers and computational scientists who are not experts in sparse matrix algorithms must write programs that compute with sparse matrices for such applications as domain-specific preconditioning, numerical optimization, and prototyping modeling methods. There are three common approaches to writing such programs:

- Use an existing numerical library. This is the easiest and safest course for the non-expert; but a library is unlikely to have the functionality or performance tuning required by a special-purpose application.
- Write directly in a low-level computer language like C++ or Fortran. This can give flexibility and good performance; but developing low-level sparse matrix code is difficult, slow, and error-prone, and the non-expert is unlikely to be able to use the best available techniques effectively.
- Write in a high-level interpreted matrix language like Matlab (as described, for example, in "Matlab Reference Guide", The MathWorks, Inc., Natick, Mass., 1992). This gives flexibility and ease of programming; but performance is unlikely to be acceptable because of the overhead of interpreting the code and because of inappropriate data structure choices, and inefficient data structure assesses especially if the application requires much vector- and scalar-level manipulation.

Thus, improved tools are needed for sparse matrix programming. The design goal is to provide a flexible, easy-to-use programming system that produces executable code that runs much faster than interpreted Matlab, and not much slower than benchmark Fortran or C library codes. The principal focus is on programs written at the vector (BLAS-1) and scalar (BLAS-0) level. Here efficiency requires choosing data representations based on more context than a single statement.

SUMMARY OF THE INVENTION

To achieve the design goal, this invention provides:

- A flexible suite of data structures for representing sparse matrices and their constituents, including operations for manipulating and transforming the sparse matrices. This suite of data structures and transformations can be implemented in any low-level computer language like Fortran or C++. The implementation that is described herein is in the form of a C++ library.
- A high-level language for describing matrix computations, coupled with an intermediate-level language for determining how the high-level operations should be implemented in terms of the data structure suite. This allows a programmer to describe sparse matrix computations at a high-level (comparable to Matlab) while, with a small added effort, getting performance comparable to tuned lower level code (comparable to Fortran or C++). In the illustrated embodiment of the invention, these intermediate-level descriptions are realized as annotations to Matlab; thus this embodiment employs a computer language called Annotated Matlab (or AML). A sparse matrix program written in AML can be translated into C++ either mechanically (by a compiler) or manually (by a programmer).

BRIEF DESCRIPTION OF THE DRAWINGS

Further objects and advantages of this invention will become evident when the following detailed description is read in conjunction with the attached drawings, in which:

FIG. 8 shows a version of the LU factorization written in Matlab;

FIG. 9 shows the LU factorization written, in accordance with this invention, in AML;

FIG. 10 shows the C++ library calls into which the AML code in FIG. 9 is transformed.

DETAILED DESCRIPTION OF THE INVENTION

While the invention is described in some detail hereinbelow with specific reference to a particular embodiment, it is to be understood that there is no intent to limit it to this embodiment. On the contrary, the intent is to cover all modifications, alternatives and equivalents falling within the spirit and scope of the invention as defined by the appended claims.

Figure 1:
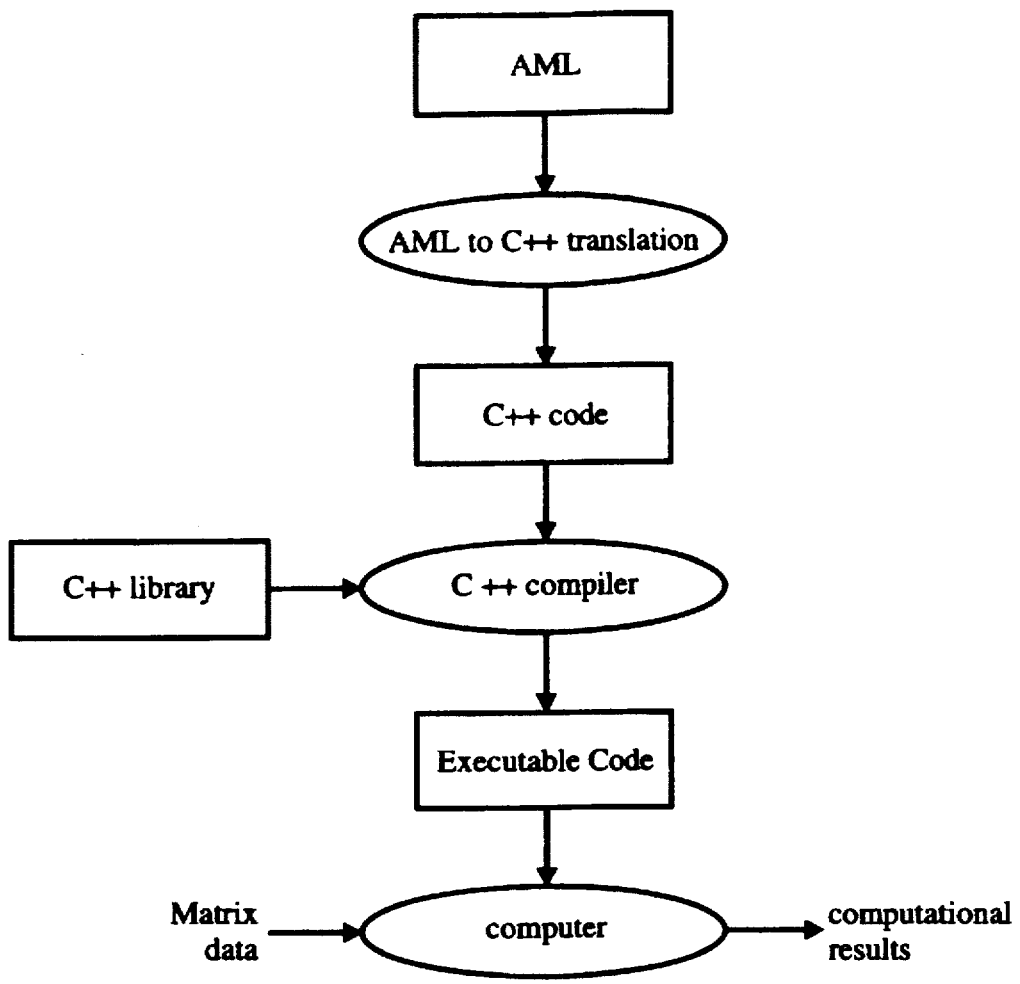
FIG. 1 outlines a process for creating an efficient sparse matrix program in accordance with this invention.

FIG. 1 outlines a process for creating an efficient sparse matrix program in accordance with this invention. The user (scientist, engineer, or programmer) writes a program in AML, as at 21. This program is then translated (either by a compiler 22 or a programmer) into calls 23 to a C++ library 24 that implements the suite of low-level data structures and operations that are described hereinbelow. This C++ program is in turn translated into executable machine code by a standard C++ compiler 25, such as g++, thereby enabling the program to be executed on a standard programmed computer.

The following Description is organized as follows: Section 1 describes a suitable suite of low-level data structures and transformations for implementing this invention. Section 2 then illustrates the use of the intermediate-level representations, using as an example a program to perform LU factorization with partial pivoting. Section 3, in turn, provides a detailed specification for the AML language that realizes the intermediate-level representation.

1.0 Low-level data structures and transformations

The low-level data structures and operations are outlined below.

The low-level data structures come with the expected operations on scalars (called BLAS-0 operations) and operations on vectors (called BLAS-1 operations). The library does not include operations between vectors and matrices (BLAS-2) and between matrices and matrices (BLAS-3), because they will be handled by specifying them at the AML level, and then translating them into C++ as above.

1.1 Full matrices and vectors

These are the standard dense-matrix representations of a matrix as a two-dimensional array, and of a vector as a one-dimensional array.

1.2 Sparse matrices and vectors

Figure 2:
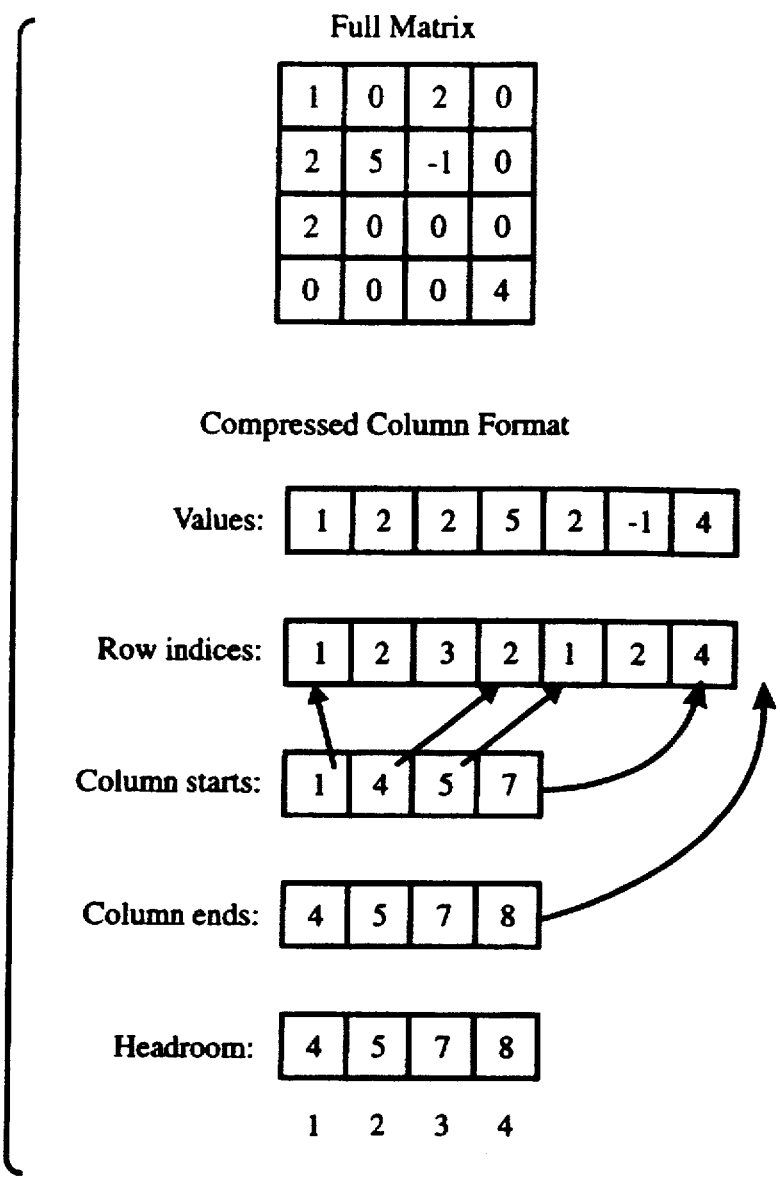
FIG. 2 illustrates a standard representation of sparse matrices and vectors in a compressed column format.

Sparse matrices and vectors are represented in a compressed column format, as shown in FIG. 2. This is a standard representation for sparse matrices, as described for example in George and Liu, Computer Solution of Large Sparse Positive Definite Systems, Prentice-Hall 1981. Within each column, nonzeros and their associated row index are stored consecutively in increasing order of row index. Three separate arrays give, for each column, a start pointer, an end pointer, and a headroom pointer. Thus it is not necessary for columns to be contiguous, though they will be by default. Explicit zeros are allowed in the data structure.

An option is for a sparse matrix to be row-traversable, that is, to have an auxiliary data structure that allows efficient sequencing through its rows. Another option is to require the columns to be contiguous, so that the headroom pointers can be eliminated. Further, if successive columns are required to start where the previous column ended, then the column end pointers can also be eliminated. Another option is not to store the nonzeros in increasing order of row index.

1.3 Sparse accumulator

The sparse accumulator (or "SPA") is a representation of a sparse vector that permits random access to individual elements in constant time, and sequencing through the nonzero elements, in constant time per element accessed. The SPA may be implemented as an array of values, a parallel array of "occupied" flags, and a list of occupied row indices. Such a representation was described for example in Gilbert, Moler, and Schreiber, "Sparse matrices in Matlab: Design and implementation," SIAM Journal on Matrix Analysis 13: 333–356, 1992.

Figure 3:
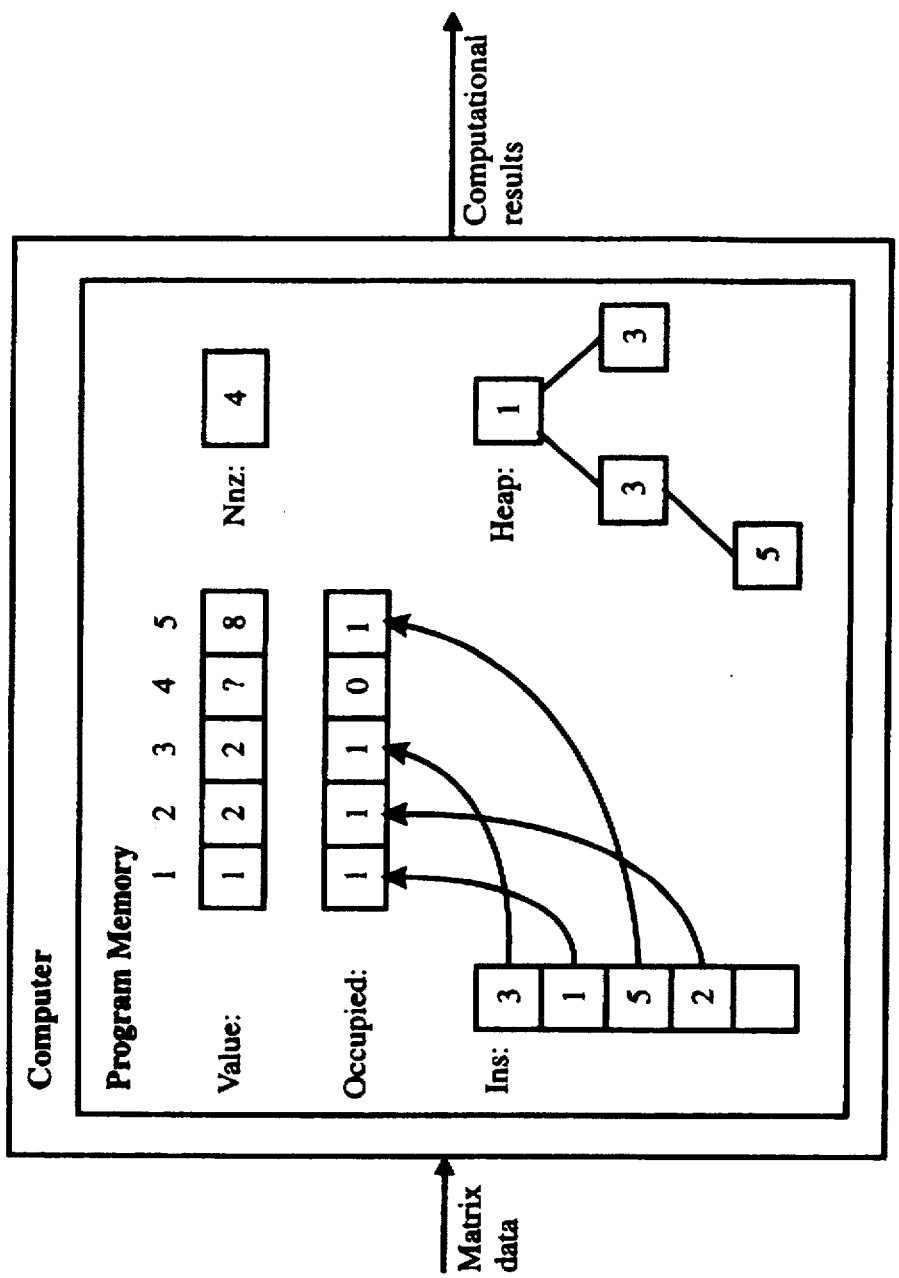
FIG. 3 illustrates an ordered SPA data structure.

An option is for a SPA to be ordered, which means that it permits sequencing through the nonzero elements in increasing order of row index even if fill is being added at the same time. Such sequencing takes logarithmic time per element. This requires adding an ordered data structure of occupied row indices to the data structure. The ordered SPA representation and the operations are described in a commonly assigned, concurrently filed U.S. patent application Ser. No. 08/573,078 of Gilbert et al. (which is hereby incorporated by reference). An ordered SPA data structure is illustrated in FIG. 3.

1.4 Iterating through nonzeros

A commonly required operation is to iterate through the nonzero elements of a sparse vector. The compressed column format for a sparse vector (section 1.2) permits this operation, simply by sequencing through the segments of the arrays of elements and row indices that represent the given vector. The SPA permits this operation, by sequencing through the list of occupied row indices. (This sequence may not correspond to increasing row number.) The ordered SPA permits this operation, by repeatedly finding the minimum element of the heap of row indices.

Figures 4, 5:
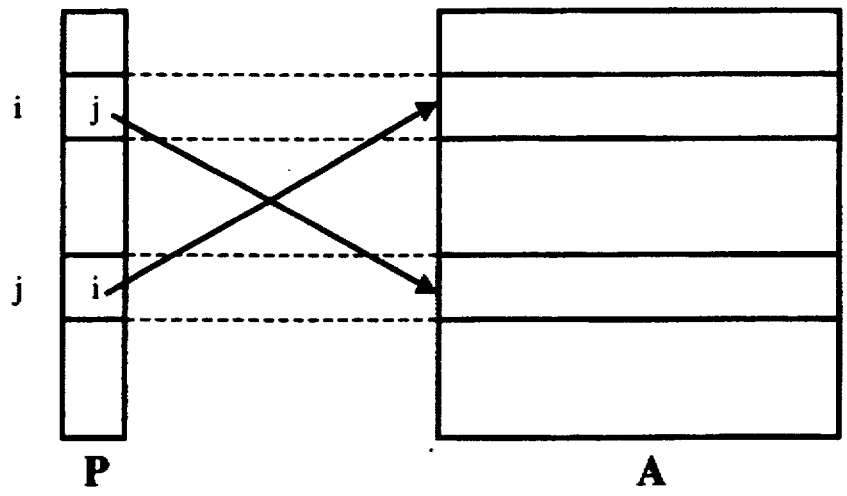
FIG. 4 illustrates how this invention expresses a low-level operation of iterating through nonzeros, which cannot be naturally expressed in a standard high-level language like Matlab.
FIG. 5 the technique this invention provides for associating a matrix or vector with a permutation to achieve automatic referencing.

As FIG. 4 shows, the low-level operation of iterating through nonzeros cannot be written in a natural fashion in a high-level language like Matlab. (The naive loop iterates through both zeros and nonzeros; the Matlab loop is inefficient, complicated, and difficult to program correctly.) FIG. 4 also shows our intermediate-level construction "for nzs . . . in" that specifies this iteration in AML.

1.5 Permutations

Another commonly required operation is to permute the rows or columns of a matrix or vector. Rather than doing this by explicitly reordering the elements, we can simply record the permutation as an array of integers. Then, for example, two rows of a matrix can be exchanged implicitly just by exchanging two entries in the permutation vector.

If a matrix has an associated permutation vector, then every access to an element of the matrix must be made indirectly through the permutation. As shown in FIG. 5, our intermediate-level representation includes a way to associate a matrix or vector with a permutation so that the indirect reference is made automatically. The AML construction for this is "view . . . through".

2.0 Example: Sparse LU factorization

This section describes a typical process for writing an efficient sparse matrix program using the tools provided by this invention. The program is one to compute the LU factorization, with partial pivoting, of a sparse matrix. The algorithm used is a "left-looking" column-oriented algorithm; see for example Gilbert and Peierls, "Sparse partial pivoting in time proportional to arithmetic operations," SIAM Journal on Scientific and Statistical Computing 9: 862–874, 1988 for a description of left-looking LU factorization algorithms.

Figures 6, 7:
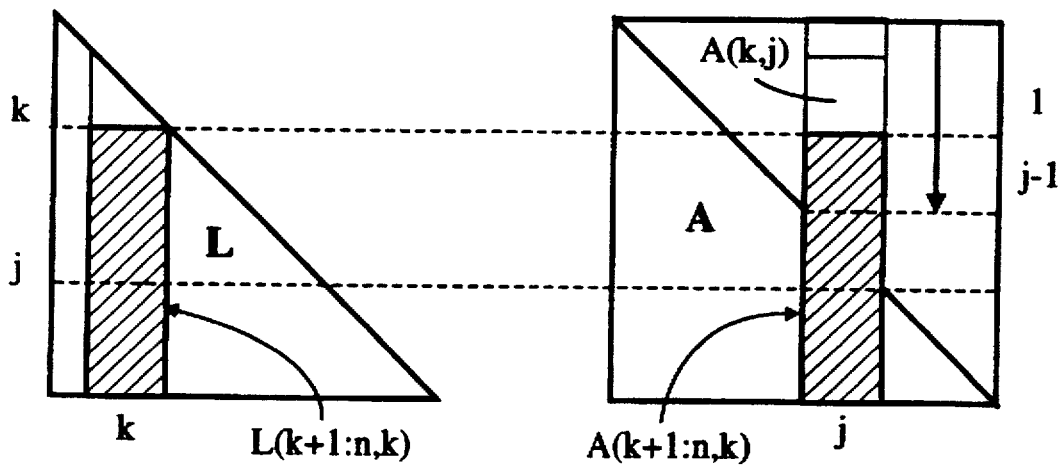
FIG. 6 shows a high-level description of an LU factorization.
FIG. 7 illustrates the update step of the LU factorization shown in FIG. 6.

FIG. 6 shows a high-level description of the LU factorization. The main loop is over the columns of the matrix; each iteration computes one column of the factors L and U. The most computationally expensive part of the computation is the Update step, which is shown in more detail in FIG. 7. The update step is itself a loop over columns to the left of the current column. Although the loop runs over all values of k from 1 to j−1, the update is empty if the element A(k,j) is zero. Thus, for efficiency, the loop should only run over the nonzero elements of column j of A. Since this column is changing during the loop, it will be necessary to use an ordered SPA representation for it.

FIG. 8 shows a version of the LU factorization written in Matlab. This implementation is inefficient both because it is executed by an interpreter, and because there is no way to specify that the active column should be represented and manipulated as a SPA. It is also difficult to read and error-prone to write, because of the complicated expression for iteration over nonzeros and the need to mention the permutation P explicitly whenever one of the matrix or vector variables is used.

FIG. 9 shows the LU factorization written in AML. Here the program is simpler to understand and easier to write correctly, because the permutation is specified only in the view statements, and the iteration through nonzeros is made explicit. Also, the program is much more efficient, because AML allows the specification of a SPA. (In fact, this will be an ordered SPA, because of the "in order" clause in the iteration.)

FIG. 10 shows the C++ library calls into which the AML code in FIG. 9 is transformed. This code is efficient, but is very difficult to read or to write. As described above, it is produced mechanically (by a programmer or a compiler) from the AML code.

Figure 11:
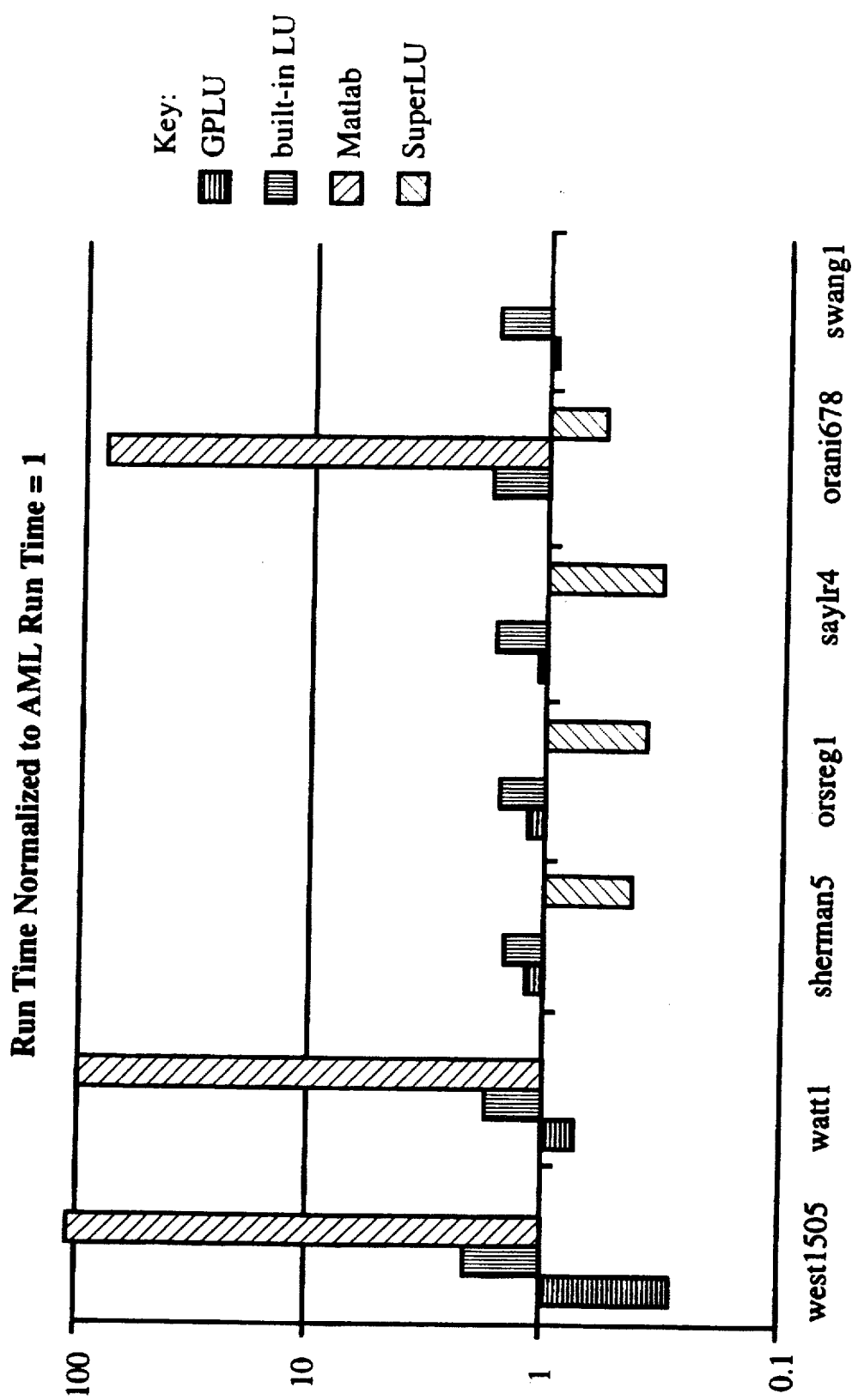
FIG. 11 shows the results of an experiment to measure the efficiency of the executable code generated in accordance with this invention.

FIG. 11 shows the results of an experiment to measure the efficiency of the executable code generated by our method, compared to several other codes for LU factorization. The four codes compared to ours are (1) the Fortran code from Gilbert and Peierls (cited above), which uses a complicated special-purpose depth-first search technique to replace the iteration through the ordered SPA; (2) the sparse LU factorization built into the core of Matlab, which is written in C and uses the same technique as Gilbert/Peierls; (3) the Matlab code from FIG. 8; and (4) an experimental code called SuperLU that uses very sophisticated cache optimization techniques, and is at present the fastest available LU factorization code. For each code, a bar shows the ratio of its running time to the running time of our executable code (on a Sun SparcStation 20 computer). Thus, a bar extending upward indicates that our code was faster; a bar extending downward indicates that our code was slower. The table shows timing results for each of seven sample sparse matrices.

The executable code derived from AML is faster than the interpreted Matlab code by a factor of about 100. The AML code ranges from about 3 times as fast to about ½ as fast as the benchmark Gilbert/Peierls and Matlab-core codes. In this experiment it is never worse than ¼ times as fast as the best research code, SuperLU. This confirms that that the present invention attains the goal of being much faster than interpreted Matlab, and not much slower than benchmark Fortran or C codes.

3.0 Annotated Matlab

This section includes a detailed specification of the annotations that describe how to implement the matrix and vector data structures and operations. Adding these annotations to Matlab yields the AML language. As will be seen, a notion of lexical block is introduced into the Matlab programming environment to supplement its existing notion of function-wide scoping. Thus, it is to be understood that all statements that have statement lists inside (if, for, and while) define a block consisting of the statements inside. Further, a new begin/end statement also defines such a scope block.

```
Syntax:
    begin <statement*> end
```

3.1 Implicit Permutation.

This mechanism allows an array to be treated as if it had been permuted.

```
Syntax:
    view <ArrayVariable> through <PermutationVariable*>
    <PermutationVariable*> is a list of permutation vectors, one
    corresponding to each dimension in the <ArrayVariable>.
```

This non-executable statement is effective throughout the enclosing lexical scope. A lexical block with such a statement behaves the same way as it would have by replacing all occurrences of <ArrayVariable> with the same variable but with the permutations applied.

While this statement has some resemblance to a declaration, it is not one, since it affects the result of the program. Further, it should be noted that this statement differs from replacing the array by its permutation in two ways: At the end of the lexical scope, the permutation is undone. If the permutation is updated while the view is in effect, the effect of the change is seen in array accesses.

3.1.1 Using implicit permutation and no permutation together

For those cases where it is useful to view an array both with and without a permutation in the same block, it would be possible to extend the syntax of view . . . through as follows:

```
view <ArrayVariable> through <Permutation Variable*> as
    <OtherArrayVariable>
```

The declaration is semantically equivalent to replacing all occurrences of <OtherArrayVariable> in the lexical block by <ArrayVariable> with the permutations from <PermutationVariable> applied.

3.2 Declarations

In keeping with generally accepted practices, declarations never change the result returned by a program; they only affect efficiency.

3.2.1 Scope

All declarations pertain to variables within some lexical scope.

3.2.1.1 Functions

A declaration may occur just after a function header, in which case it describes required properties of an argument to the function. Multiple function definitions may be given of the same function. Function invocations will choose among them based on which definition's declarations match the arguments of the call.

Note: functions are polyvariant with respect to both types and representations of their arguments. The implementation can compile separate versions of a function for each type and representation that it is called with.

3.2.1.2 Blocks

All other declarations have an effect lexically within a block. They must occur before the first use of their variable in the block, and apply to all occurrences of the variable within the block, unless overridden in a contained block.

3.2.2 Type Declarations

In order to allow compile-time resolution of ambiguities that might be caused due to the overloaded uses of certain operators/procedure names, a programmer can declare types of variables.

```
Syntax:
<Type> <Variable*>
<Type>::= {int | real | complex} {scalar | vector | row vector | matrix} |
    permutation | range
```

Semantics notes:
Vector means column vector.
Permutation implies int vector.
Range implies int vector.

3.2.3 Representation Declarations

These declarations provide a means of specifying alternative representations of arrays.

```
Syntax:
<Representation> <Variable*>
<Representation>::= {spa | sparse | full}
    {rows direct}
    {columns direct}
    {transposed}
    {ordered columns}
```

Semantics notes:
The representation declarations are not powerful enough to fully specify what the compiler needs to know about how arrays are represented. Rather, they specify some properties of the representations, which the compiler uses, together with defaults, to determine the full specification of the representation. The previous section describes the full specifications used by the compiler.

Rows (columns) direct means that implementation of references to the rows (columns) of the array does not involve an indirection through a permutation vector. The default is to use a direct representation, with two exceptions: in the scope of a view statement, the default is to be indirect on the permutation used in the view; and when passing an indirectly represented matrix to a function, the indirection is preserved. Thus, a direct specification is primarily significant inside the scope of a view statement or for a function that might be called from inside the scope of a view statement.

Transposed means that the representation inverts the usual row-column order for that representation. The default is that the representation is not transposed, except for row vectors or when a variable is initialized with the result of the transpose operation. Note that transposed pertains to the representation, not to the indices. In particular, the first index is always the row index and the second is the column index, no matter whether the matrix is transposed.

Ordered columns means that the numbers stored with each column are stored in ascending order. The default is not to have columns ordered, but iteration over rows (see below) requires it, and makes this assertion inside its scope.

Note: it is possible to allow the converses of the direct, ordered, and transposed declarations, if necessary.

3.3 Special Iterators 3.3.1 Iterators over nonzero elements
Iteration over nonzeros.

```
Syntax:
  for nzs <variable> {in order} in <Vector> <Statement*> end
```

Semantic notes:

In successive iterations, <variable> is bound to indices of nonzero elements of <Vector>. If in order is specified, then the indices will be monotonically increasing. Furthermore, if in order is specified and <Vector> is a variable then it is legal to modify elements of <Vector> that lie beyond the index, and the iteration will cover nonzeros added during previous iterations.

3.3.2 Iterators over rows and columns

```
Syntax:
  for (rows | columns) <variable> in <Array> <Statement*> end
```

Semantic notes:

In successive iterations, <variable> is bound to the indices of successive rows or columns of <Array>. Furthermore, access to the designated row or column should be implemented efficiently, taking advantage of <variable>'s stepping incrementally. The value of <Array> is allowed to change during the loop, but changes behind the current iteration will not be visited, and nonzeros introduced between the current row and the next nonzero will be slow.

3.3.3 Extended version of iterators over rows and columns

The construction in the previous subsection is limited in two ways: it cannot handle efficient access to rows of several arrays simultaneously, and it cannot handle efficient access to several rows of one array.

To resolve this, it would be possible to extend the language with the following more general declaration:

```
incremental <Array variable>[<index*>]
```

Valid instances of this declaration can occur only inside a for statement. Such declarations indicate that access to the specified part of the array should exploit the incrementality of the loop variable. By using several such declarations, a user may specify incremental traversals through several arrays or through several rows of one array.

4.0 Library specification

A suitable C++ library for implementing this invention includes the following routines.

4.1 Classes 4.1.1 Types

Value—double

AbsValue—double

Position—int

Iteration—int

Row—int

Column—int 4.1.2 Basic objects

SparseMatrix

SparseVector

SPA

FullMatrix

FullVector 4.1.3 Miscellaneous objects

Range

Permutation

Enumerator

IndexVector

NoRange

NoPermutation

NoEnumerator

Operation 4.2 Functionality:

In many of the following calls, a matrix argument is followed by a permutation and a range. The semantics is that the result should be as if the order of the rows of the matrix were permuted according to the permutation, and then the set of rows restricted to the range. NoPermutation is a constant indicating the identity permutation, and Norange is a constant indicating the entire range.

4.2.1 class SPA:

SPA( )—create a SPA of size 0

SPA(int N)—create a SPA of size N

~SPA( )—destroy SPA

General functions:

void zero( )—make the SPA to be empty int size( )—returns size of the SPA int nz( )—returns number of nonzero elements in the SPA int n_explicit—returns number of explicit elements in the SPA Element access member functions:

bool is_explicit(Position)—is the element explicit?

Value get_value(Position)—returns value of the element at this Position void change_value(Position,Value)—assigns value to the nz element void insert(Position,Value)—assigns value to the implicit element void assign(Position,Value)—assigns value to any element bool is_nonzero(Position)—is the element nonzero?

Position Iteration2Position(Iteration)—returns value of the index

Element access non-member functions:

bool is_nonzero(SPA&, Row, Permutation,Range)
Value get_value(SPA&, Row, Permutation,Range)
void change_value(SPA&, Row, Value, Permutation, Range)
void insert(SPA&, int Row, Value,Permutation,Range, Enumerator)
void assign(SPA&, int Row, Value, Permutation,Range, Enumerator)
Position <-> index functions
Position Row2Position(SPA&, Row, Permutation,Range) returns the position corresponding to the row
int Position2Row(SPA&, Position pos, Permutation, Range)
returns the index of the position
Iterator functions
Iteration get_first(SPA&, Permutation,Range)
Iteration get_next(SPA&,Iteration, Permutation,Range)
bool last(SPA&, Iteration,Permutation,Range)
Loading functions
void load(SPA&,Permutation,Range,SPA&,Permutation, Range)
void load(SPA&, Permutation,Range,SparseVector&, Permutation,Range)
void load(SPA&, Permutation, Range,FullVector&, Permutation)

4.2.2 class SparseVector

SparseVecotr(SparseMatrix &, int column)
  creates a SparseVector forthe column of the matrix
SparseVector(int n, int nz)
  creates a SparseVector of size n with the storage for nz explicit elements.
General functions
int size( )—returns the size of the vector
int nz( )—returns number of the nonzero elements in the vector
int n_explicit( )—returns number of the explicit elements in the vector
Element access member functions
Value get_value(Iteration)
Position get_position(Iteration)
Element access functions
Row get_row(SparseVector&, Iteration, Permutation, Range)
Value get_value(SparseVector&, Iteration, Permutation, Range)
void change_value(SparseVector&, Iteration, Permutation, Range,Value)
Iterator functions
Iteration get_first(SparseVector&, Permutation, Range)
Iteration get_next(SparseVector&, Permutation, Range, Iteration)
bool live(SparseVector&, Permutation, Range, Iteration)

4.2.3 class SparseMatrix

Note: In the following, s and one of i or j can be scalars, i.e. I need separate functions
SparseMatrix( )—creates a matrix with 0 nonzeros
SparseMatrix(SparseMatrix&)—creates a copy of the sparse matrix
SparseMatrix(FullMatrix&)—creates a sparse matrix from the full matrix
SparseMatrix(i,j,s,m,n,nzmax, h)
  m×n matrix with the space for nzmax explicit elements. The elements are |i,j,s|. h is the headroom vector
SparseMatrix(i,j,s,m,n,length(s),h)
SparseMatrix(i,j,s, max(i),max(j),length(s),0)
SparseMatrix(m,n,z,h)—creates a m×n matrix with the space for z nonzeros
SparseMatrix(m,n,z) etc.
~SparseMatrix( )—destroys SparseMatrix
General functions
int size( )—returns the size of the square matrix
void size(int &m, int& n)—returns the size of any matrix
int ncols( )—returns number of the columns in the matrix
int nrows( )—returns number of the rows in the matrix
int nz( )—returns the number of nonzero elements in the matrix
int n_explicit( )—returns number of explicit elements in the matrix
Column functions
SparseVector get_column(Column j)
  returns a SparseVector corresponding to the column j
Element access functions
Value get_value(SparseMatrix&, Permutation, Range, Column, Row)
void change_value(SparseMatrix&, Permutation,Range, Column, Row)
void insert_value(SparseMatrix&, Permutation,Range, Column, Row)
void assign_value(SparseMatrix&, Permutation, Range, Column, Row)
Load functions
void load(SparseMatrix &)—copies a matrix
void load(FullMatrix &)—store FullMatrix as SparseMatrix
void store(SPA&, Permutation,Range, Column)
Structure functions
void use_sorted_columns( )
void use_unsorted_columns( )
Row traversable iterator
void setup_row_iterator( )
void next_row( )
void is_last_row( )
void extract_current_row(SPA &)
Note: it would be desirable to make a row iterator independent of matrix to allow multiple row iterators
Submatrix operations
assign_submatrix_right(SparseMatrix& dest, SparseMatrix& source,
  Permutation, Range, IndexVector row_index, IndexVector col_index)
A=B[ ... ]—copies submatrix of the source matrix into the destination matrix
assign_submatrix_left(SparseMatrix& dest, Permutation,Range, SparseMatrix& source, Permutation, Range, IndexVector row_index, IndexVector column_index)
A[ ... ]=B—writes source submatrix of the submatrix of the destination matrix
assign_submatrix_both(SparseMatrix& dest, Permutation,Range, IndexVector dest_row_index, IndexVector dest_col_index, SparseMatrix& source, Permutation, Range, IndexVector source_row_index, IndexVector source col_index)

A[ ... ]=B[ ... ]
4.2.4 class FullVector
FullVector( )
FullVector(int size)
~FullVector( )
General functions
int size( )—returns number of elements in the vector
int nz( )—returns number of nonzero elements in the vector
Loading functions
load(Permutation&)
load(FullMatrix &, Column)
load(SparseVector &)
load(FullVector &)
load(SPA&)
Element access functions
Value get_value(Row, Permutation)
Iterator functions
Row get_first(FullVector&, Permutation)
Row get_next (FullVector&, Permutation, Row)
bool live(FullVector&, Permutation,Row)
4.2.5 class FullMatrix
FullMatrix(int ncols, int nrows)—creates a matrix with 0 nonzeros
~FullMatrix( )—destroys FullMatrix
General functions
int size( )—returns the size of the square matrix
void size(int &m, int& n)—returns the size of any matrix
int ncols( )—returns number of the columns in the matrix
int nrows( )—returns number of the rows in the matrix
int nz( )—returns the number of nonzero elements in the matrix
Column functions
FullVector get_column(Column j)
  returns a FullVector corresponding to the column j
Element access functions
Value get_value(FullMatrix&, Permutation, Range, Column, Row)
void assign_value(FullMatrix&, Permutation, Range, Column, Row)
Load functions
void load(FullMatrix &)—copies a matrix
void load(SparseMatrix &)—store SparseMatrix as Full-Matrix
Submatrix operations
assign_submatrix_right(FullMatrix& dest, FullMatrix& source, Permutation, Range, IndexVector row_index, IndexVector col_index)
  A=B[ ... ]—copies submatrix of the source matrix into the destination matrix
assign_submatrix_left(FullMatrix& dest, Permutation, Range, FullMatrix& source, Permutation,Range, IndexVector row_index, IndexVector column_index)
  A[ ... ]=B—writes source submatrix of the submatrix of the destination matrix
assign_submatrix_both(FullMatrix& dest, Permutation, Range, IndexVector dest_row_index, IndexVector dest_col_index, FullMatrix& source, Permutation, Range, IndexVector source_row_index, IndexVector source col_index)
  A[ ... ]=B[ ... ]

4.2.6 class Permutation
Permutation( )—creates a 0 size permutation descriptor (PD)
Permutation (int n)—allocates a PD of size n
Permutation (const Permutation &pd)—copies the permutation
Permutation (const FullVector & pd)—creates a pd from the full vector
~Permutation( )—destroys the permutation
  initialize(n)—sets the permutation to be the identity permutation of size n
operator=(const FullVector &)
operator=(const Range)
void swap(int i, int j)—interchanges i and j entries
int org2true(int i)—inverse permutation
int true2org(int i)—direct permutation
Permutation & compose(const Permutation &pd)—applies pd to the current PD
bool is_permutation( ) const—checks whether the PD is valid or not
4.2.7 class Range
Range( )—creates an empty range
Range (int f, int l)—creates range [f:l]
Range(const Range &)—copies the range
bool within_range(int k) const—checks if k is in range
set (inf f, int l)—changes the range
operator=—copies the range
size( )—return size of the range
int get_first( )—returns beginning of the range
int get_last( )—return end of the range
int get_shift( )—return index shift imposed by range
void set_first( )—sets the beginning of range
void set_last( )—sets the end of range
void has_range( )—returns true (for compatibility with NoRange)
4.2.8 class Enumerator
Enumerators on SPA's will enumerate over new nonzeros are added to the SPA beyond where the enumeration has reached so far. The SPA keeps track of the associated Enumeration object to make this work.
  Enumerator(SPA&, Permutation, Range)
  Enumerator(SparseVector&, Permutation,Range)
  Row get_first( )—returns and removes the first element in the heap
  void insert(Row)—inserts element in the heap
4.2.9 class Indexvector
IndexVector(int n)
~IndexVector( )
int org2true(int i) const
4.2.10 class NoRange
bool within_range(int k) const {return true;}
int get_shift( ) const {return 0;}
bool has_range( ) {return false;}
4.2.11 class NoPermutation
int org2true(int i) const {return i;}
int true2org(int i) const {return i;}
4.2.12 class NoEmumerator
void insert(int row) { };

4.3 Vector traversal functions (search and arithmetic operations)

foo1 (FullVector &, Permutation,Range, Operation, Arguments)

foo1(SPA &, Permutation,Range, Operation, Arguments)

foo1(SparseVector &, Permutation, Range, NoInsertOperation, Arguments)—Comment: An example is void findMaxAbs(SPA &, Permutation, Range, Position&, Value&) which sets the position and value to the index and value of the largest element. Another is: void divide(SparseVector &, Permutation, Range, Value) which divides each element of the vector by the Value, storing the result back in the vector.

foo2(FullVector&, Permutation,Range, const SparseVector&, Permutation,Range, Operation, Arguments)

foo2(FullVector&, Permutation,Range, const FullVector&, Permutation,Range, Operation, Arguments)

foo2(FullVector&, Permutation, Range, const SPA&, Permutation, Range, Operation, Arguments)

foo2(SPA&, Permutation,Range, const SparseVector&, Permutation,Range, Operation, Arguments)

foo2(SPA&, Permutation,Range, const FullVector&, Permutation,Range, Operation, Arguments)

foo2(SPA&, Permutation, Range, const SPA&, Permutation,Range, Operation, Arguments)

Comment: An example is void dpaxpy(SPA&, Permutation,Range, const SparseVector&, Permutation,Range, Value) which multiplies the vector by the value and adds the result to the SPA.

foo3(Vector1&, Permutation,Range, const Vector2&, Permutation,Range, const Vector3&, Permutation, Range, Operation, Arguments)

with the following rules for Vector1, Vector2 and Vector 3:

1) Vector1 can be either FullVector or SPA

2) Only one of Vector2 or Vector3 can be SparseVector

3) For any combination of Vector2 and Vector3 types, only one type of Vector1 is supported, namely the type of the result of this operation according to AML type resolution rules.

Comment: An example is void split(SPA&, Permutation, Range, SparseVector&, Permutation, Range, SparseVector&, Permutation, Range, Position) which sets the first sparse vector to all the nonzeros of the SPA with index less than the position and sets the second sparse vector to all the nonzeros with index greater than or equal to the position.

What is claimed:

1. A method for generating computationally efficient computer program code for carrying out computer computations on a plurality of different matrix data types, said method comprising the steps of writing a program in a relatively high-level language which includes programmer specifiable constructs for manipulating said matrix data types and parts thereof; at least certain of said constructs permitting annotations specifying programmer selected data structures for alternative implementations of matrix data types and programmer selected operations on said data structures for program implementation of the respective constructs;

translating the high-level program into a relatively low-level language using low-level language routines that provide a compilable representation of the program, including all programmer selected data structures and all programmer selected operations on said data structures;

compiling the low-level language representation of said program to generate computer executable code for implementing said program, including all programmer selected data structures and all programmer selected operations on said data structures.

2. The method of claim 2 wherein said low-level language is C++.

3. The method of claims 1 or 2 wherein said data structures include a sparse matrix data structures.

4. The method of any of claims 1–2 further including the step of executing said executable code on a computer for performing said computation.

\* \* \* \* \*